US012798260B2

(12) United States Patent
Uematsu

(10) Patent No.: US 12,798,260 B2
(45) Date of Patent: Nov. 17, 2026

(54) PRINTER AND METHOD

(71) Applicant: Toshiba Tec Kabushiki Kaisha, Tokyo (JP)

(72) Inventor: Kaoru Uematsu, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 91 days.

(21) Appl. No.: 19/048,389

(22) Filed: Feb. 7, 2025

(65) Prior Publication Data

US 2025/0360726 A1 Nov. 27, 2025

(30) Foreign Application Priority Data

May 27, 2024 (JP) ................................ 2024-085639

(51) Int. Cl.

*B41J 2/325* (2006.01)
*B41J 3/407* (2006.01)
*B41J 25/304* (2006.01)
*G06K 15/02* (2006.01)

(52) U.S. Cl.

CPC ............. *B41J 2/325* (2013.01); *B41J 3/4075* (2013.01); *B41J 25/304* (2013.01); *G06K 15/028* (2013.01)

(58) Field of Classification Search

CPC ... B41J 2/32; B41J 3/4075; B41J 2/325; B41J 2/315; B41J 2/33; B41J 25/304; G06K 15/028

See application file for complete search history.

(56) References Cited

U.S. PATENT DOCUMENTS 5,459,504 A * 10/1995 Sato ......................... B41J 13/03 400/636
2016/0288528 A1* 10/2016 Matsuda ................ B41J 25/304
2017/0361630 A1* 12/2017 Harigae ................... B41J 11/42

FOREIGN PATENT DOCUMENTS

JP H05278290 A 10/1993

* cited by examiner

*Primary Examiner* — Kristal Feggins
(74) *Attorney, Agent, or Firm* — Kim & Stewart LLP

(57) ABSTRACT

A printer includes a printing head to perform printing on a conveyed medium, a moving unit configured to move the printing head, an ink ribbon conveying unit to convey an ink ribbon and stop the conveyance, a storage unit to store a conveying speeds of the medium in association with non-printing region dimensions for ribbon save operations, a nonprinting region determining unit to determine, based on printing data to be printed, whether at least one of the blank regions corresponds to one of the stored nonprinting region dimensions for ribbon save operations, and a first medium conveying unit to perform a ribbon save operation, if it is determined that a blank region in the printing data corresponds to one of the nonprinting region dimensions.

20 Claims, 14 Drawing Sheets

442

| REGION LENGTH SECTION (4421) | CONVEYING SPEED SECTION (4422) |
|---|---|
| 20mm | 4ips |
| 30mm | 6ips |
| 40mm | 8ips |

FIG. 6

443

4431 4432

| MODE SECTION | CONVEYING SPEED SECTION |
|---|---|
| MODE 1 | DESIGNATED CONVEYING SPEED |
| MODE 2 | CONVEYING SPEED CORRESPONDING TO LENGTH OF NONPRINTING REGION |
| MODE 3 | CONVEYING SPEED IN SHORTEST NONPRINTING REGION |
| MODE 4 | SWITCHING OF MODE 1 AND MODE 2 |
| MODE 5 | SWITCHING OF MODE 1 AND MODE 3 |
| MODE 6 | SWITCHING OF MODE 1, MODE 2, AND MODE 3 |

FIG. 7

432

4321 4322 4323 4324

| NONPRINTING REGION SECTION | LENGTH INFORMATION SECTION | CONVEYING SPEED SECTION | NONPRINTING REGION SECTION |
|---|---|---|---|
| NONPRINTING REGION A | 45mm | 8ips | tb,te |
| NONPRINTING REGION B | 32mm | 6ips | tf,ti |
| NONPRINTING REGION C | 22mm | 4ips | tj,tm |

PRINTER AND METHOD

CROSS-REFERENCE TO RELATED APPLICATION

This application is based upon and claims the benefit of priority from Japanese Patent Application No. 2024-085639, filed May 27, 2024, the entire contents of which are incorporated herein by reference.

FIELD

Embodiments described herein relate generally to a printer and a control method of a printer.

BACKGROUND

There are printers that print on label stock or receipt paper. Such a printer may be installed in a back office of a store to print commodity information (e.g., a commodity name, a commodity price, a best-before date, and the like) for print labels to be placed on products for sale.

As one type of such a printer, there is a printer that transfers ink from an ink ribbon and prints on label stock or the like. The conveying speed of media to be printed may be set in advance so the ink ribbon can be conveyed at a matching speed. Therefore, when a nonprinting the conveying direction is greater than or equal to some predetermined length, a ribbon save function for stopping the conveyance of the ink ribbon is possible. However, the ribbon save function is difficult to implement when a nonprinting region is shorter than the predetermined length so the ink ribbon must still be wasted in many instances.

BRIEF DESCRIPTION OF THE DRAWINGS

FIG. 6 is a memory map illustrating a memory configuration of a mode information section.

FIG. 7 is a memory map illustrating a memory configuration of a nonprinting information section.

DETAILED DESCRIPTION

An object of embodiments is to provide a printer and a control method for a printer capable of providing further savings in the amounts of an ink ribbon used in a printing process, such as a label printing process.

According to one embodiment, a printer includes a printing head configured to perform printing on a conveyed medium via an ink ribbon, a moving unit configured to move the printing head between a printing position and a retracted position, an ink ribbon conveying unit configured to convey the ink ribbon for printing on the conveyed medium by the printing head, and a storage unit configured to store nonprinting region dimensions in association with medium conveying speeds for ribbon save operations. The ribbon save operations include conveying the conveyed medium in a blank region at a particular medium conveying speed while stopping the conveyance of the ink ribbon. The printer further includes a nonprinting region determining unit configured to determine from printing data of an image to be printed on the conveyed medium whether there are any blank regions in the image corresponding to any of the nonprinting region dimensions stored in the storage unit and a medium conveying unit configured to perform a ribbon save operation in any of the blank regions corresponding to the stored nonprinting region dimensions by conveying the conveyed medium at the particular medium conveying speed through the blank region while stopping the conveyance of the ink ribbon.

Certain example embodiments are explained below. A label printer is explained as one example of a printer to which the present disclosure can be applied. A label or label stock is explained as one example of a medium to be printed. In this context, the label may be one of a plurality of labels that are stuck to a liner and can be peeled from the liner to be applied. In other example, the label may be a liner-less label. In an embodiment, a label stuck to a liner is explained. The example embodiments are not intended to limit the present disclosure.

Figure 1:
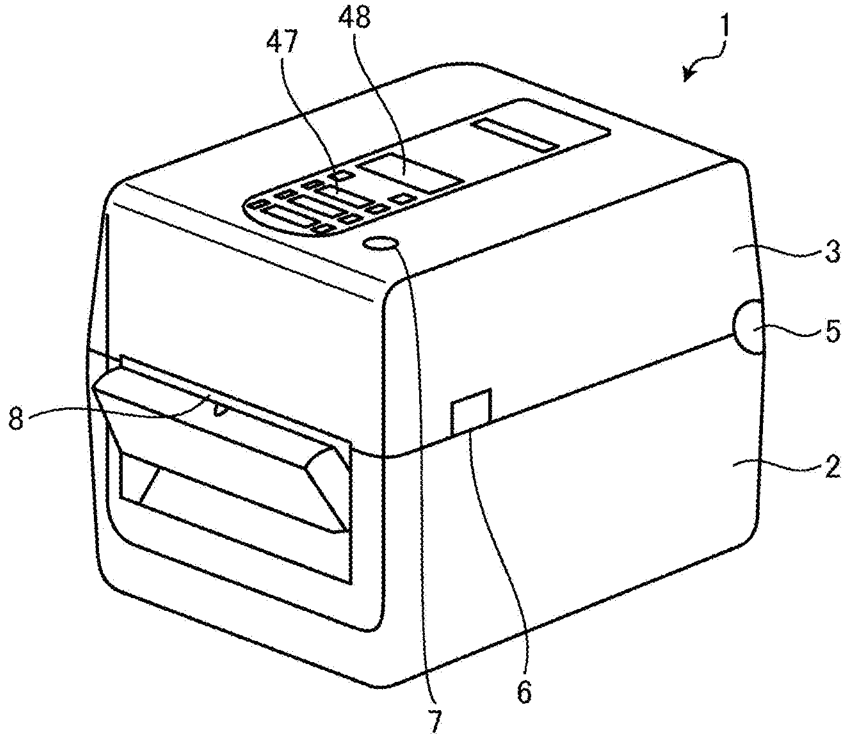
FIG. 1 is an exterior perspective view of a label printer in an embodiment.

FIG. 1 is an exterior perspective view of a printer 1 in an embodiment. The printer 1 is a label printer. As illustrated in FIG. 1, a housing of the printer 1 is formed by a main body 2 and a lid body 3. Inside the main body 2, a power supply unit and a circuit board, a paper set unit 9 (see FIG. 2) for setting paper, a platen 33 and a conveying roller 26 (for both of which, see FIG. 2) serving as a conveying unit that conveys a label, and the like are provided. The lid body 3 is connected to the main body 2 via a hinge 5. The lid body 3 is attached to be capable of turning in the up-down direction with respect to the main body 2 with the hinge 5 as a turning fulcrum. The lid body 3 turns upward with respect to the main body 2 to open the inside and turns downward to close the inside of the printer 1.

In the lid body 3, a printing head 32 and an ink ribbon 23 (for both of which, see FIG. 2) are provided. In the lid body 3, an operation unit 47 and a display unit 48 are provided. In the main body 2 or the lid body 3, a power switch 6 for turning on and off the printer 1 is provided. A paper discharge port 8 is formed in a state in which the lid body 3 is closed on the main body 2. The paper discharge port 8 discharges (dispenses) a printed label L (see FIG. 2) to the outside.

Figure 2:
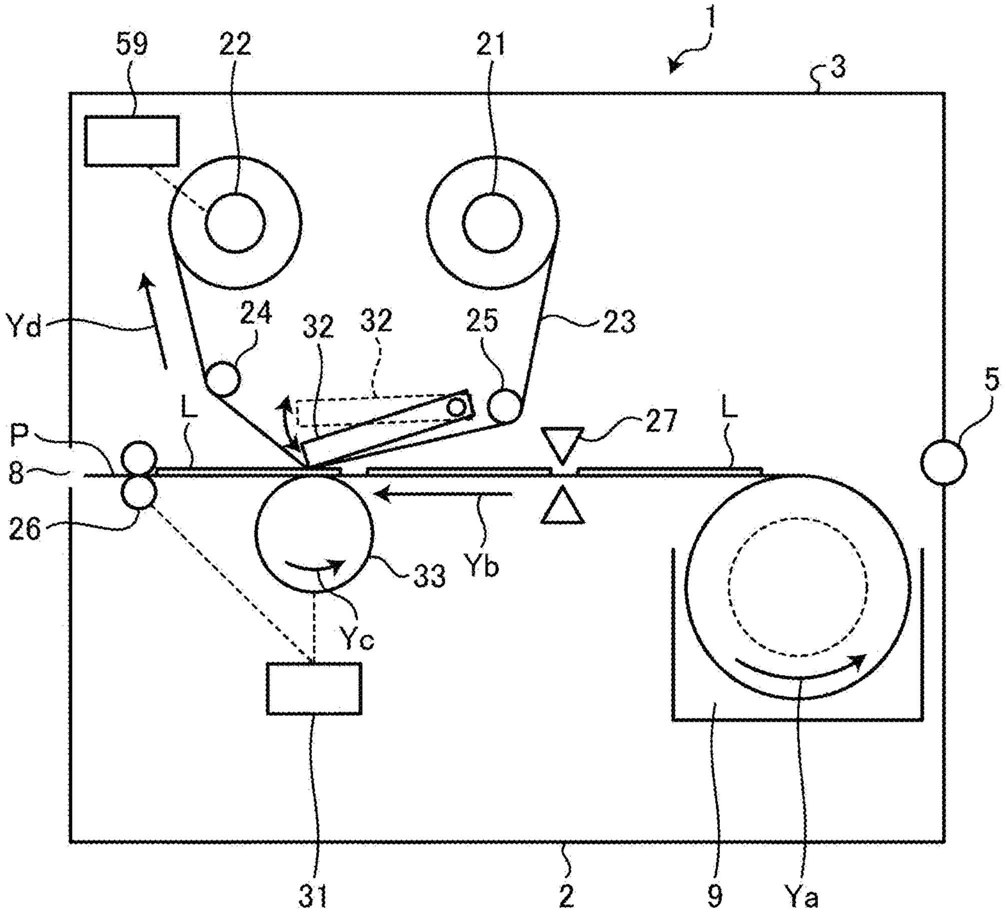
FIG. 2 is an explanatory diagram illustrating an internal structure of a label printer.

FIG. 2 is an explanatory diagram illustrating components and positional relations of the units in the state in which the lid body 3 is closed on the main body 2. As illustrated in FIG. 2, the paper set unit 9 is provided in the main body 2. Roll paper in which a plurality of labels L are stuck to a long liner P in an aligned manner is set in the paper set unit 9. In the main body 2, the platen 33 and the conveying roller 26 rotated by a platen motor 31 are provided.

On the other hand, the printing head 32 is attached to the lid body 3. The printing head 32 is, for example, a thermal head in which heat generating elements that apply heat to perform printing are linearly disposed. The lid body 3 includes a ribbon attachment shaft 21 to which the ink ribbon 23 in a wound state is attached and a ribbon winding shaft 22 for winding the ink ribbon 23 attached to the ribbon attachment shaft 21. The ink ribbon 23 drawn out from the ribbon attachment shaft 21 passes between the printing head 32 and the label L through a guide 25 and is wound by the ribbon winding shaft 22 through a guide 24. For example, thermo-fusible ink is applied to the ink ribbon 23. If heat is applied to the ink ribbon 23 by the printing head 32, the fused ink is transferred to the label L.

FIG. 2 illustrates a state in which the label L stuck to the liner P is drawn out from the roll paper set in the paper set unit 9 and the lid body 3 is closed on the main body 2. If the lid body 3 is closed on the main body 2, since the printing head 32 is located in a printing position (is head-down), the printing head 32 faces the platen 33 and is in press-contact with the platen 33. For that reason, the liner P, the label L, and the ink ribbon 23 are held by the platen 33 and the printing head 32. The printing head 32 is capable of turning (moving) between a printing position indicated by a solid line and a retracting position indicated by a dotted line. However, the printing head 32 is usually located in the printing position in a state in which the lid body 3 is closed. The printing position is a position in a state in which the printing head 32 is in press contact with the platen 33 (a position where the printing head 32 is capable of printing to the label L). The retracting position is a position where the printing head 32 is separated from the platen 33 and is capable of stopping conveyance of the ink ribbon 23. The printer 1 moves the printing head 32 to the retracting position and stops the conveyance of the ink ribbon 23 to perform ribbon save for the ink ribbon 23. The conveying roller 26 that conveys the label L printed by the printing head 32 and the liner P to an arrow Yb side is provided further on a conveying direction downstream side of the label L than the platen 33.

If the platen motor 31 is driven in this state, the platen 33 rotates in the direction of an arrow Yc. The conveying roller 26 rotates according to the driving of the platen motor 31. Then, the roll paper rotates in the direction of an arrow Ya and the liner P to which the label L is stuck is drawn out. The drawn out label L and liner P are conveyed in the direction of an arrow Yb. At the same time, a ribbon conveyance motor 59 is driven and the ribbon winding shaft 22 rotates, whereby the ink ribbon 23 is conveyed in the direction of an arrow Yd. The label L conveyed in the arrow Yb direction is held by the printing head 32 and the platen 33 together with the ink ribbon 23. The ink applied to the ink ribbon 23 is transferred to the label L by heat generated from the printing head 32 and characters and figures are printed on the surface (a printing surface) of the label L. The printed label L is conveyed by the conveying roller 26 and discharged to the outside from the paper discharge port 8. The ink ribbon 23 and the label L in a position held by the printing head 32 and the platen 33 are conveyed in the same direction at substantially the same speed.

If ribbon save for the ink ribbon 23 explained below is performed, the printing head 32 moves (heads up) to the retracting position. Then, the conveyance (the winding) of the ink ribbon 23 by the ribbon winding shaft 22 stops and the conveyance of the ink ribbon 23 stops. On the other hand, the label L and the liner P are continuously conveyed in the arrow Yb direction by the rotation of the conveying roller 26. In this way, in the nonprinting region of the label L, the ribbon save operation in which the label L is conveyed but the conveyance of the ink ribbon 23 stops is performed.

Figure 3:
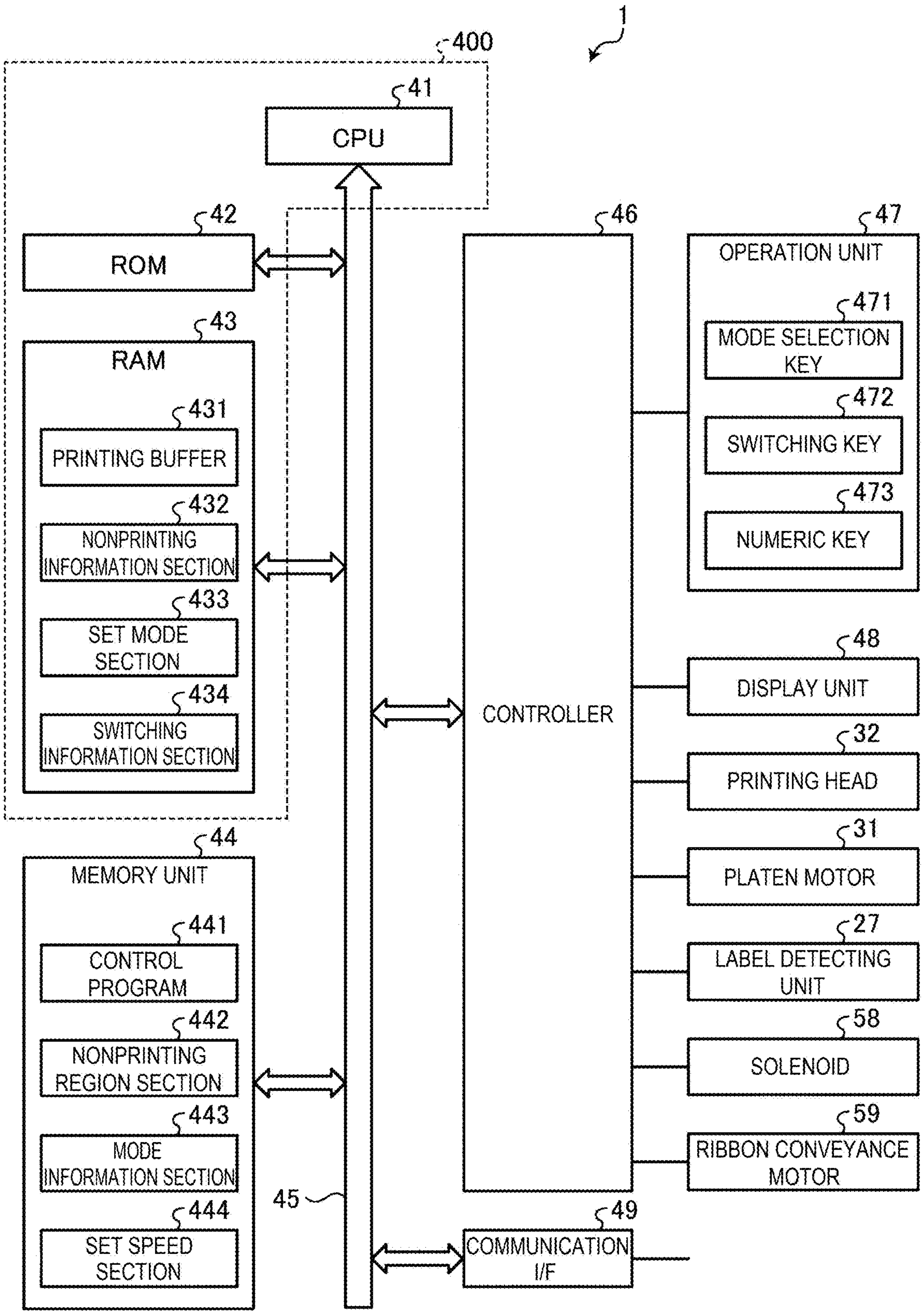
FIG. 3 is a block diagram illustrating components of a label printer.

Hardware of the printer 1 is explained below. FIG. 3 is a block diagram illustrating hardware components of the printer 1. As illustrated in FIG. 3, the printer 1 includes a CPU (Central Processing Unit) 41 that is an example of a processor, a ROM (Read Only Memory) 42, a RAM (Random Access Memory) 43, and a memory unit 44. The CPU 41 is a control entity. The ROM 42 stores various programs. Programs and various data are loaded in the RAM 43. The memory unit 44 stores various programs. The CPU 41, the ROM 42, the RAM 43, and the memory unit 44 are connected to one another via a bus 45. The CPU 41, the ROM 42, and the RAM 43 configure a control unit 400. That is, the CPU 41 operates according to a control program stored in the ROM 42 or the memory unit 44 and loaded in the RAM 43, whereby the control unit 400 executes control processing for the printer 1 explained below.

The RAM 43 includes a printing buffer 431, a nonprinting information section 432, a set mode section 433, and a switching information section 434. The printing buffer 431 stores image data that is dot images (bitmap images) of characters and images to be printed on the label L, the image data being created based on printing data received from an information processing device such as a PC (Personal Computer). An example of the image data stored in the printing buffer 431 (that is, printed on one label L) is illustrated in FIG. 4.

Figures 4, 5:
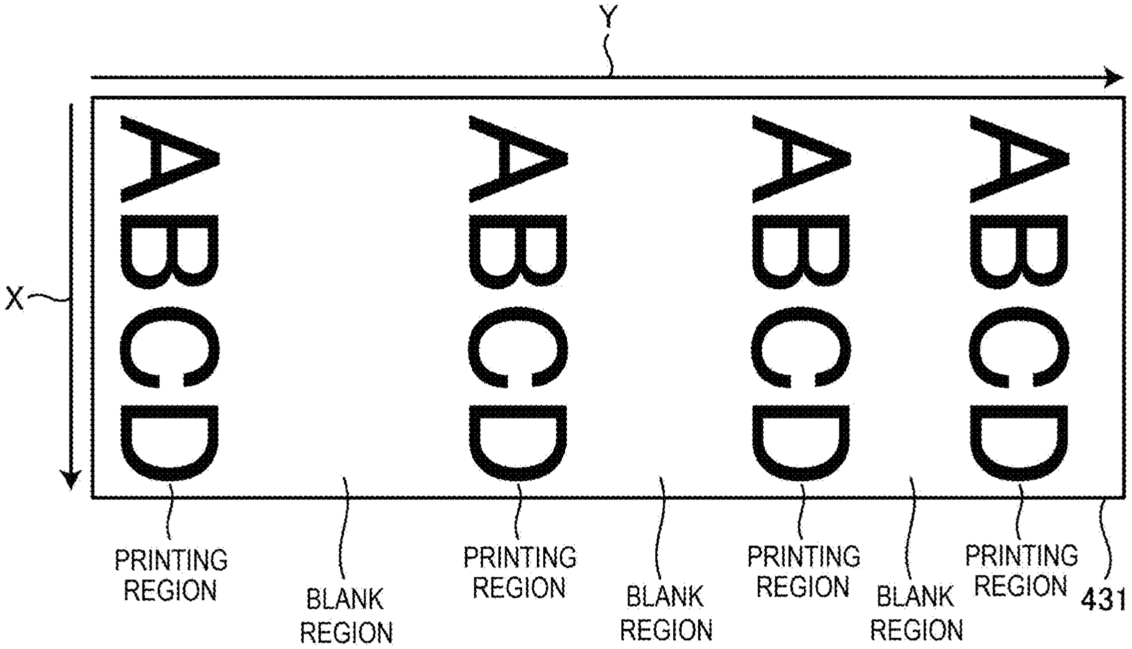
FIG. 4 is a diagram illustrating an example of image data to be printed on labels.
FIG. 5 is a memory map illustrating a memory configuration of a nonprinting region section.

In the printing buffer 431, for example, image data in which characters "ABCD" illustrated in FIG. 4 are printed in four places of the label L is created. The "ABCD" are respectively image data printed at different intervals from one another. The portions of the characters "ABCD" are printing regions and interval portions where printing is not performed are blank regions. Among the blank regions, a blank region, the length of which in the conveying direction of the label L (an arrow Y direction) is equal to or larger than a predetermined length, is referred to as nonprinting region. The nonprinting information section 432 stores information concerning the nonprinting region in one label L, the information being created based on the image data created in the printing buffer 431. The nonprinting information section 432 is explained below with reference to FIG. 7. The set mode section 433 stores mode information of a mode used (set) in the printer 1 among mode information indicating conveying speeds of a plurality of kinds of labels L in the nonprinting region, the mode information being stored in a mode information section 443 explained below. The switching information section 434 stores, among the mode information stored in the mode information section 443, mode information of a switched mode if a switchable mode is selected. Note that, in FIG. 4, the arrow Y direction is the conveying direction of the label L. As depicted in FIG. 4, the label L is printed from the left side toward the right side of the label L. An arrow X direction is the line direction (scan direction). The label L is printed line by line along the arrow Y direction (sub-scan direction).

The memory unit 44 is configured by a nonvolatile memory such as a HDD (Hard Disc Drive) or a flash memory in which stored information is retained even if the power is turned off. The memory unit 44 includes a control program section 441, a nonprinting region section 442, the mode information section 443, and a set speed section 444. The control program section 441 stores a control program for controlling the printer 1. The nonprinting region section 442 stores, in association, lengths of a plurality of nonprinting regions and conveying speeds for conveying the label L in the nonprinting regions. The nonprinting region section 442 are explained below with reference to FIG. 5. The mode information section 443 stores mode information of modes determined for each of the conveying speeds of the label L in the nonprinting regions. The mode information section 443 is explained below with reference to FIG. 6. If a mode is set for conveying the label L at predetermined speed (fixed speed), the set speed section 444 stores the set conveying speed.

The control unit 400 is connected to the operation unit 47, the display unit 48, the printing head 32, the platen motor 31, a label detecting unit 27, a solenoid 58, and the ribbon conveyance motor 59 via the bus 45 and a controller 46. The operation unit 47 is a key for operating the printer 1 and includes a mode selection key 471, a switching key 472, and numeric keys 473. The mode selection key 471 is a key for setting a mode indicating a conveyance form of the label L (one mode among modes stored in the set mode section 433). If the mode selection key 471 is operated, the conveyance form of the label L in the printer 1 can be changed. The switching key 472 is a key that switches the conveyance form of the label L in the set mode. If the switching key 472 is operated, the conveyance form of the label L can be switched in the set mode. The numeric keys 473 are number keys of “0” to “9”. The display unit 48 displays information such as the set mode and the form of the switched conveying speed to an operator who operates the printer 1.

The printing heads 32 generates heat and applies the heat to the ink ribbon 23 to fuse the ink from the ink ribbon 23 on the label L. That is, the printing head 32 prints characters and figures on the surface of the label L using the ink ribbon 23. The platen motor 31 is driven to rotate the platen 33 and the conveying roller 26. The label detecting unit 27 is, for example, an optical transmission sensor and detects, according to a state of transmitted light, the label L on the liner P and the head (start) position of the label L. The solenoid 58 moves the printing head 32 to the printing position and the retracting position. For example, if the solenoid 58 is energized, the solenoid 58 operates to move the printing head 32 to the retracting position (head up the printing head 32). If the energization to the solenoid 58 is stopped, the operation of the solenoid 58 is released to move the printing head 32 to the printing position (head down the printing head 32). The ribbon conveyance motor 59 rotates the ribbon winding shaft 22 to wind the ink ribbon 23. If the ink ribbon 23 is wound, the ink ribbon 23 is supplied from the ribbon attachment shaft 21. The ink ribbon 23 is conveyed in the arrow Yd direction.

The controller 46 receives an instruction from the control unit 400 and controls the operation unit 47, the display unit 48, the printing head 32, the platen motor 31, the label detecting unit 27, the solenoid 58, and the ribbon conveyance motor 59. In the following explanation, for convenience of explanation, control performed by the controller 46 is explained as being performed by the control unit 400.

The control unit 400 is connected to a communication unit 49 via the bus 45. The communication unit 49 is communicably connected to, via a communication line such as a LAN (Local Area Network), an information processing device that transmits printing information.

Subsequently, the nonprinting region section 442 is explained. FIG. 5 is a memory map illustrating a memory configuration of the nonprinting region section 442. As illustrated in FIG. 5, the nonprinting region section 442 includes a region length section 4421 and a conveying speed section 4422. The region length section 4421 stores the length of a nonprinting region (the length in the arrow Y direction in FIG. 4). The conveying speed section 4422 stores, in association with the length of the nonprinting region stored in the region length section 4421, conveying speed of the label L conveyed in the arrow Y direction in the nonprinting region.

In the case of an example illustrated in FIG. 5, 4 ips (inch per second) is stored in the conveying speed section 4422 in association with a nonprinting region of 20 mm stored in the region length section 4421. This indicates that, if the length of the nonprinting region in the arrow Y direction is 20 mm or larger, the conveying speed of the label L is 4 ips. That is, if the nonprinting region in the arrow Y direction is 20 mm or larger, this indicates that, if the conveying speed of the label L is 4 ips, it is possible to perform ribbon save for heading up the printing head 32 (move the printing head 32 to the retracting position) and stopping the conveyance of the ink ribbon 23. Conversely, if the blank region in the arrow Y direction is smaller than 20 mm (if the blank region is smaller than 20 mm, the blank region is not referred to as nonprinting region), it is temporally difficult to perform, if the conveying speed of the label L is 4 ips, ribbon save for heading up the printing head 32 and stopping the conveyance of the ink ribbon 23.

In FIG. 5, 6 ips is stored in the conveying speed section 4422 in association with a nonprinting region of 30 mm stored in the region length section 4421. This indicates that, if the nonprinting region in the arrow Y direction is 30 mm or larger, the conveying speed of the label L is 6 ips. That is, if the nonprinting region in the arrow Y direction is 30 mm or larger, this indicates that, if the conveying speed of the label L is 6 ips, it is possible to perform the ribbon save for heading up the printing head 32 and stopping the conveyance of the ink ribbon 23. Conversely, if the nonprinting region in the arrow Y direction is 20 mm or larger and smaller than 30 mm, this indicates that, if the conveying speed of the label L is 6 ips, it is temporally difficult to perform the ribbon save for heading up the printing head 32 and stopping the conveyance of the ink ribbon 23.

In FIG. 5, 8 ips is stored in the conveying speed section 4422 in association with a nonprinting region of 40 mm stored in the region length section 4421. This indicates that the conveying speed of the label L is 8 ips if the nonprinting region in the arrow Y direction is 40 mm or larger. That is, if the nonprinting region in the arrow Y direction is 40 mm or larger, this indicates that, if the conveying speed of the label L is 8 ips, it is possible to perform the ribbon save for heading up the printing head 32 and stopping the conveyance of the ink ribbon 23. Conversely, if the nonprinting region in the arrow Y direction is 20 mm or larger and smaller than 40 mm, this indicates that, if the conveying speed of the label L is 8 ips, it is temporally difficult to perform the ribbon save for heading up the printing head 32 and stopping the conveyance of the ink ribbon 23.

That is, if the nonprinting region in the arrow Y direction is 20 mm or larger and smaller than 30 nm, it is possible to perform the ribbon save if the conveying speed of the label L is 4 ips. If the nonprinting region in the arrow Y direction is 30 nm or larger and smaller than 40 mm, it is possible to perform the ribbon save if the conveying speed of the label L is 6 ips. If the nonprinting region in the arrow Y direction is 40 mm or larger, it is possible to perform the ribbon save if the conveying speed of the label L is 8 ips.

Subsequently, the mode information section 443 is explained. FIG. 6 is a memory map illustrating a memory configuration of the mode information section 443. As illustrated in FIG. 6, the mode information section 443 includes a mode section 4431 and a conveying speed section 4432. The mode section 4431 stores types of modes that can be set in the printer 1 (can be stored in the set mode section 433). In an example illustrated in FIG. 6, the mode section 4431 stores mode information indicating six kinds of modes (a mode 1 to a mode 6). The conveying speed section 4432 stores, in association with the modes stored in the mode section 4431, conveying speeds of the label L in the respective modes.

In the case of the example illustrated in FIG. 6, "designated conveying speed" is stored in association the mode 1. That is, if the mode 1 is selected, the control unit 400 performs control for conveying the label L at the conveying speed stored in the set speed section 444 (that is, in the case of the mode 1, the control unit 400 performs processing in FIG. 15 explained below). "Conveying speed corresponding to the length of the nonprinting region" is stored in association with the mode 2. That is, if the mode 2 is selected, the control unit 400 performs processing in FIG. 12 explained below. That is, the control unit 400 conveys the label L at conveying speed corresponding to the length in the arrow Y direction of the nonprinting region with reference to the nonprinting region section 442. For example, if the length in the arrow Y mm, since the nonprinting region is between 20 mm and 30 mm, for the nonprinting region, the label L is conveyed at conveying speed of 4 ips with reference to the nonprinting region section 442. For example, if the length along the arrow Y direction is 32 mm, the control unit 400 conveys the label L at conveying speed of 6 ips with reference to the nonprinting region section 442. For example, if the length along the arrow Y direction is 45 mm, since this length is 40 mm or larger, the control unit 400 conveys the label L at a conveying speed of 8 ips with reference to the nonprinting region section 442. If the length along the arrow Y direction is smaller than 20 mm (that is, in the case of a blank region smaller than the smallest length of a stored nonprinting region), the control unit 400 does not implement the ribbon save operation of setting the conveying speed of the label L to be lower than 4 ips (that is, does not perform the ribbon save). This is for preventing printing speed of the label L from becoming too low.

In this example, if "Conveying speed of the shortest nonprinting region" is stored in association with the mode 3. That is, if the mode 3 is selected, the control unit 400 performs processing in FIG. 13. That is, for example, if three types of nonprinting regions are stored including a nonprinting region of 22 mm, a nonprinting region of 32 mm, and a nonprinting region of 45 mm are present, the control unit 400 refers to the nonprinting region section 442 and then, for all these nonprinting regions, conveys the label L at 4 ips (which is the speed associated with 20 mm that is the shortest stored nonprinting region). If two types of nonprinting regions including a nonprinting region of 32 mm and a nonprinting region of 45 mm are present, the control unit 400 refers to the nonprinting region section 442 and then, for all the nonprinting regions, conveys the label L at 6 ips (which is the speed associated with 30 mm that is the shortest nonprinting region).

In this example, if "Switching of the mode 1 and the mode 2" is stored in association with the mode 4. That is, if the mode 4 is selected, the control unit 400 executes a selected mode of the mode 1 or the mode 2. If "Switching of the mode 1 and the mode 3" is stored in association with the mode 5. That is, if the mode 5 is selected, the control unit 400 executes a selected mode of the mode 1 or the mode 3. If "Switching of the mode 1, the mode 2, and the mode 3" is stored in association with the mode 6. That is, if the mode 6 is selected, the control unit 400 executes a selected mode of the mode 1, the mode 2, or the mode 3. A mode may be selected by, for example, operation of the mode selection key 471 and input of a mode number by the numeric keys 473. For example, if the mode 1 is selected, the mode 1 is selected by operation of the mode selection key 471 and the numeric key 473 of "1". If a mode is selected, a mode may be selected according to the number of times the mode selection key 471 is operated (for example, the mode 2 is selected if the mode selection key 471 is operated twice) instead of operating the numeric keys 473.

Switching of a mode in the mode 4 to the mode 6 is performed by operating the switching key 472 after the mode is selected. For example, if the mode 4 is selected, the mode 1 and the mode 2 are switched every time the switching key 472 is operated. For example, if the mode 6 is selected, a mode is switched in the order of the mode 1, the mode 2, and the mode 3 every time the switching key 472 is operated. Mode information of the mode selected by the mode selection key 471 is stored in the set mode section 433. Mode information of the mode switched by operating the switching key 472 is stored in the switching information section 434.

Subsequently, the nonprinting information section 432 is explained. The nonprinting information section 432 stores information concerning a nonprinting region on a label L (in this example, a blank region of 20 mm or larger is referred to as a nonprinting region) created based on image data in the printing buffer 431. After image data illustrated in FIG. 4 is created, the control unit 400 determines whether any printing data is included in one line in a disposition direction of the heat generating elements (the arrow X direction) of the printing head 32. In FIG. 4, the control unit 400 first determines whether any printing data is included in image data for the line on the leftmost side. If printing data of at least one dot is included, the control unit 400 determines that the line is a printing region. If printing data of at least one dot is not included (zero dots; no printing data), the control unit 400 determines that the line is a blank region. After making the determination for the image data for the line on the leftmost side in FIG. 4, the control unit 400 then makes the same determination for image data for a line on the right side and makes the same determination for each line along the arrow Y direction in FIG. 4. The control unit 400 makes the same determination for each line in the image data stored in the printing buffer 431 (that is, determines whether each line is a printing region or a blank region). This line checking process may be referred to as a scan. The control unit 400 performs the scan on the image data stored in the printing buffer 431 and determines whether each line therein is a printing region or a blank region. Then, the control unit 400 determines whether all lines are printing regions or blank regions.

Figure 8:
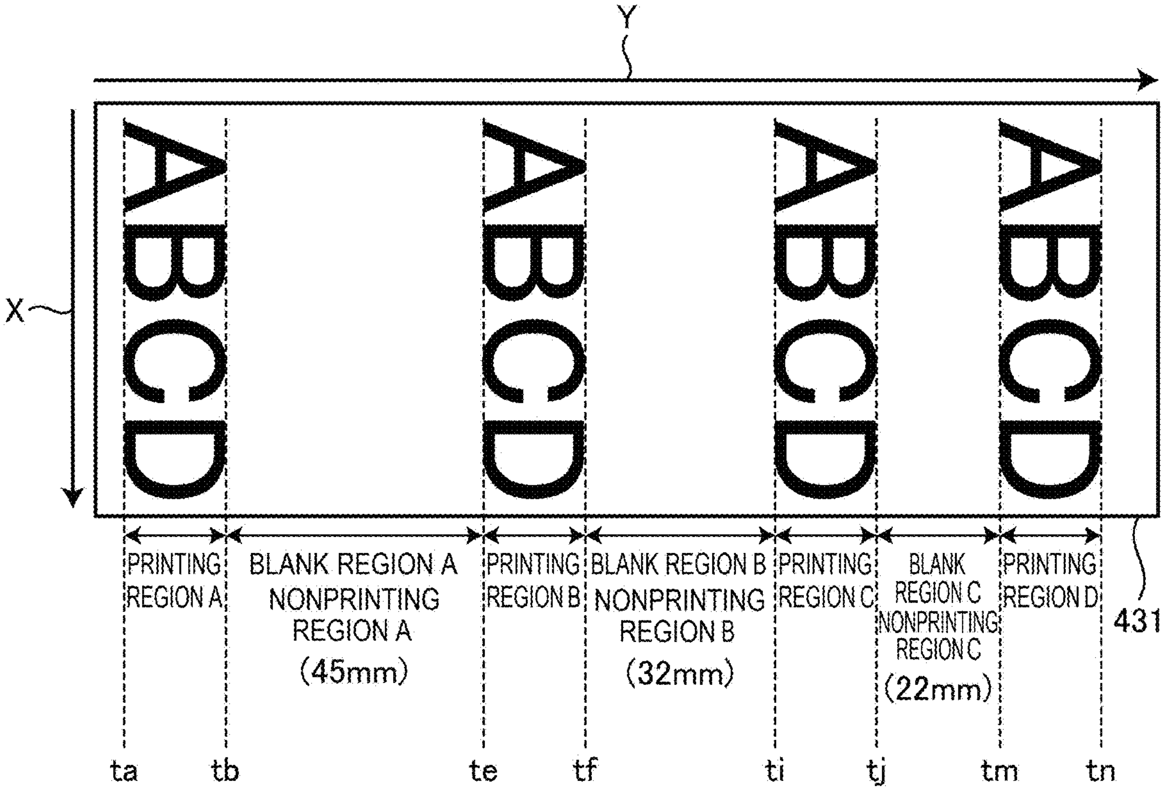
FIG. 8 is an explanatory diagram illustrating an example of printing regions and nonprinting regions in image data stored in a nonprinting information section.

FIG. 8 illustrates a result of performing the scan for the image data stored in the printing buffer 431. In FIG. 8, a range to be scanned is from a coordinate ta to a coordinate tn in the arrow Y direction. In FIG. 8, a region from the coordinate ta to a coordinate tb in the arrow Y direction is a printing region A, a region from the coordinate tb to a coordinate the in the arrow Y direction is a blank region A, a region from the coordinate the to a coordinate tf in the arrow Y direction is a printing region B, a region from the coordinate tf to a coordinate ti in the arrow Y direction is a blank region B, a region from the coordinate ti to a coordinate tj in the arrow Y direction is a printing region C, a region from the coordinate tj to a coordinate tm in the arrow Y direction is a blank region C, and a region from the coordinate tm to the coordinate tn in the arrow Y direction is a printing region D. Since the length in the arrow Y direction of the image data for one line is known, a distance between coordinates (that is, length of a blank region) can be calculated based on the number lines continuous with each other in the blank region. In the case of FIG. 8, the distance from the coordinate tb to the coordinate the (the length of the blank region A) is 45 mm, the distance from the coordinate tf to the coordinate ti (the length of the blank region B) is 32 mm, and the distance from the coordinate tj to the coordinate tm (the length of the blank region C) is 22 mm. As a result of scanning the printing buffer 431 in this way, all of the blank region A, the blank region B, and the blank region C are determined to be 20 mm or larger. Therefore, the blank region A, the blank region B, and the blank region C are nonprinting regions (a nonprinting region A, a nonprinting region B, and a nonprinting region C).

The nonprinting information section 432 stores information concerning the blank regions determined as the nonprinting regions as a result of scanning the printing buffer 431. FIG. 7 is a memory map illustrating a memory configuration of the nonprinting information section 432. The nonprinting information section 432 includes a nonprinting region section 4321, a length information section 4322, a conveying speed section 4323, and a coordinate information section 4324. The nonprinting region section 4321 stores information for specifying the blank regions determined as the nonprinting regions. The length information section 4322 stores the lengths (the lengths in the arrow Y direction) of the nonprinting regions in association with the specifying information stored in the nonprinting region section 4321. The conveying speed section 4323 stores conveying speeds of the label L conveyed in the nonprinting regions in association with the specifying information stored in the nonprinting region section 4321. The conveying speeds are determined based on the conveying speeds stored in the nonprinting region section 442 in association with the lengths of the nonprinting regions stored in the length information section 4322. In the coordinate information section 4324, coordinates of start positions and coordinates of end positions of the nonprinting regions are stored. The control unit 400 recognizes the start positions and the end positions of the nonprinting regions according to coordinate information stored in the coordinate information section 4324.

FIG. 7 illustrates the nonprinting information section 432 created based on the scan result illustrated in FIG. 8. In FIG. 7, the length of the nonprinting region A is 45 mm (which is longer than 40 mm). For that reason, the conveying speed of 8 ips corresponding to the length of 40 mm is stored in the conveying speed section 4323 from the nonprinting region section 442 illustrated in FIG. 5. The start coordinate tb and the end coordinate the of the nonprinting region A are stored in the coordinate information section 4324. The length of the nonprinting region B is 32 mm (which is longer than 30 mm but shorter than 40 mm). For that reason, the conveying speed of 6 ips corresponding to the length of 30 mm is stored in the conveying speed section 4323 from the nonprinting region section 442 illustrated in FIG. 5. The start coordinate tf and the end coordinate ti of the nonprinting region B are stored in the coordinate information section 4324. The length of the nonprinting region C is 22 mm (which is longer than 20 mm but shorter than 30 mm). For that reason, the conveying speed of 4 ips corresponding to the length of 20 mm is stored in the conveying speed section 4323 from the nonprinting region section 442 illustrated in FIG. 5. The start coordinate tj and the end coordinate tm of the nonprinting region C are stored in the coordinate information section 4324.

Figure 9:
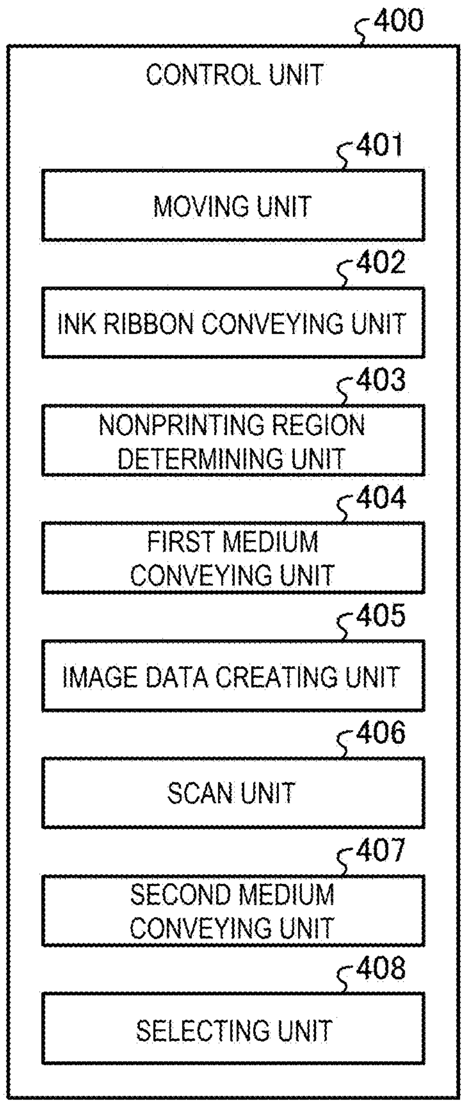
FIG. 9 is a functional block diagram illustrating functional aspects of a printer.

Functional aspects of the printer 1 are explained below. FIG. 9 is a functional block diagram illustrating certain functional aspects of the printer 1. The control unit 400 of the printer 1 executes a control program stored in the ROM 42 or the control program section 441 of the memory unit 44 to provide the functions of a moving unit 401, an ink ribbon conveying unit 402, a nonprinting region determining unit 403, a first medium conveying unit 404, an image data creating unit 405, a scan unit 406, a second medium conveying unit 407, and a selecting unit 408.

The moving unit 401 moves the printing head 32 between the printing position and the retracting position. Specifically, the moving unit 401 drives the solenoid 58 and moves the printing head 32 between the printing position and the retracting position. For example, in the embodiment, the moving unit 401 energizes the solenoid 58, heads up the printing head 32 to the retracting position, shuts off the energization to the solenoid 58, and heads down the printing head 32 to the printing position.

The ink ribbon conveying unit 402 conveys the ink ribbon 23 for transferring ink to the label L and stops the conveyance. Specifically, the ink ribbon conveying unit 402 drives the ribbon conveyance motor 59 to rotate and stop the ribbon winding shaft 22 and conveys the ink ribbon 23 for transferring ink to the label L and stops the conveyance.

The nonprinting region determining unit 403 determines, based on printing data to be printed on the label L, whether one or a plurality of blank regions where printing is not performed on the label L respectively correspond to any of the nonprinting regions stored in the nonprinting region section 442. Specifically, the nonprinting region determining unit 403 evaluates, based on the printing data to be printed on the label L, the lengths of continuous blank regions which will not be printed within the label L and determines whether these blank regions correspond to any of the nonprinting regions stored in the nonprinting region section 442. In the present embodiment, since a blank region having the length of 22 mm is larger than 20 mm but smaller than 30 mm, the nonprinting region determining unit 403 determines that this blank region corresponds to a nonprinting region having the length of 20 mm, since a blank region having the length of 32 mm is larger than 30 mm but smaller than 40 mm, the nonprinting region determining unit 403 determines that this blank region corresponds to a nonprinting region having the length of 30 mm, and, since a blank region having the length of 45 mm is larger than 40 mm, the nonprinting region determining unit 403 determines that this blank region corresponds to a nonprinting region having the length of 40 mm.

If it is determined that the blank region matches the criteria for any one of the established nonprinting region values, the first medium conveying unit 404 performs the ribbon save operation while conveying the label L at the conveying speed corresponding to the determined particular nonprinting region value. Specifically, if it is determined that the blank region corresponds to any of the established nonprinting regions, the first medium conveying unit 404 performs the ribbon save operation for moving (heading up) the printing head 32 to the retracting position with the moving unit 401 while conveying the label L at conveying speed corresponding to the determined nonprinting region and stopping the conveyance of the ink ribbon 23 with the ink ribbon conveying unit 402.

If it is determined that the blank region corresponds to any of the nonprinting regions, in all the nonprinting regions, the second medium conveying unit 407 performs the ribbon save while conveying the label L at the conveying speed corresponding to the corresponding nonprinting region having the shortest length. Specifically, if it is determined that the blank region corresponds to any one of the nonprinting regions, in all the nonprinting regions, the second medium conveying unit 407 performs the ribbon save for moving (heading up) the printing head 32 to the retracting position with the moving unit 401 while conveying the label L at conveying speed corresponding to the corresponding nonprinting region having the shortest length and stopping the conveyance of the ink ribbon 23 with the ink ribbon conveying unit 402.

The selecting unit 408 selectively causes one of the first medium conveying unit 404 and the second medium conveying unit 407 to execute. Specifically, the selecting unit 408 operates the mode selection key 471 and the switching key 472 to selectively execute one of the first medium conveying unit 404 and the second medium conveying unit 407.

The image data creating unit 405 creates, based on printing data to be printed on the label L, image data (bitmap data) that the printing head 32 can print on the label L.

The scan unit 406 performs a scan for determining the presence or absence of printing data in each line in the image data created by the image data creating unit 405/Specifically, the scan unit 406 performs a scan in the arrow Y direction in FIG. 8 for determining the presence or absence of the printing data line by line in the arrow X direction (a direction orthogonal to a conveying direction of the label L, that is, the disposition direction of the heat generating elements).

The nonprinting region determining unit 403 can thus evaluate, based on the scan by the scan unit 406, the length of each of the blank regions (if any) where printing is not going to be performed on the label L and determines whether the blank regions correspond to any of the nonprinting regions stored in the nonprinting region section 442.

Figure 10:
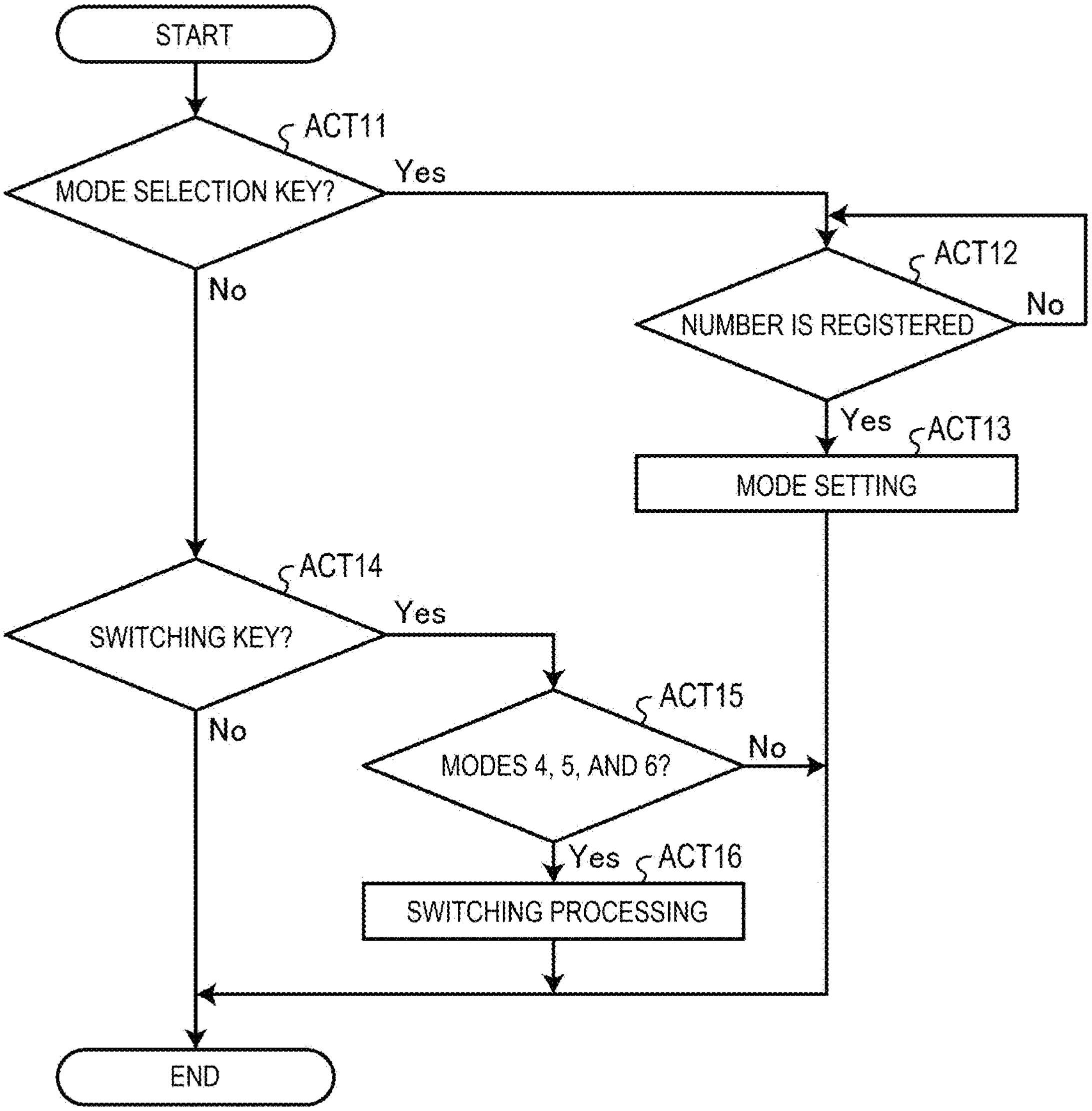
FIG. 10 is a flowchart of control processing relating to mode setting for a printer.

Control of the printer 1 is explained below. First, mode setting processing for the printer 1 is explained. FIG. 10 is a flowchart of control processing relating to mode setting for the printer 1. As illustrated in FIG. 10, the control unit 400 of the printer 1 determines whether the mode selection key 471 was operated (ACT 11). If the mode selection key 471 was operated (Yes in ACT 11), subsequently, the control unit 400 determines whether a number is registered by the numeric keys 473 (ACT 12). The control unit 400 stays on standby until a number is registered (No in ACT 12). If a number is registered (Yes in ACT 12), the control unit 400 refers to the mode information section 443 and sets a mode corresponding to the registered number in the set mode section 433 (that is, selects a mode). In the embodiment, any one mode of the mode 1 to the mode 6 illustrated in FIG. 6 is set. Then, the control unit 400 ends the processing and returns to ACT 11. Although not illustrated in FIG. 6, as a mode stored in the set mode section 433 according to operation of the mode selection key 471, there may be a mode switched to one of the mode 2 and the mode 3.

If the mode selection key 471 was not operated (No in ACT 11), the control unit 400 determines whether the switching key 472 was operated (ACT 14). If the switching key 472 was operated (Yes in ACT 14), the control unit 400 next determines whether any one of the mode 4, the mode 5, and the mode 6 is stored in the set mode section 433 (ACT 15). If any one mode of the mode 4, the mode 5, and the mode 6 is stored (Yes in ACT 15), the control unit 400 executes switching processing (a change of the mode stored in the switching information section 434) based on the mode stored in the set mode section 433. For example, if the mode 4 is stored in the set mode section 433, the control unit 400 changes the mode stored in the set mode section 433 to one of the mode 1 and the mode 2 each time the switching key 472 is operated. For example, if the mode 5 is stored in the set mode section 433, the control unit 400 changes the mode stored in the set mode section 433 to one of the mode 1 and the mode 3 every time the switching key 472 is operated. For example, if the mode 6 is stored in the set mode section 433, the control unit 400 changes the mode stored in the set mode section 433 from the mode 1 to the mode 2, from the mode 2 to the mode 3, and from the mode 3 to the mode 1 each time the switching key 472 is operated.

If determining in ACT 15 that all of the mode 4, the mode 5, and the mode 6 are not stored (that is, any one of the mode 1, the mode 2, and the mode 3 is stored) (No in ACT 15), the control unit 400 ends the processing and returns to ACT 11. If the switching key 472 was not operated (No in ACT 14), the control unit 400 ends the processing and returns to ACT 11. The processing in ACT 11 to the processing in ACT 16 correspond to the selecting unit 408.

Figure 11:
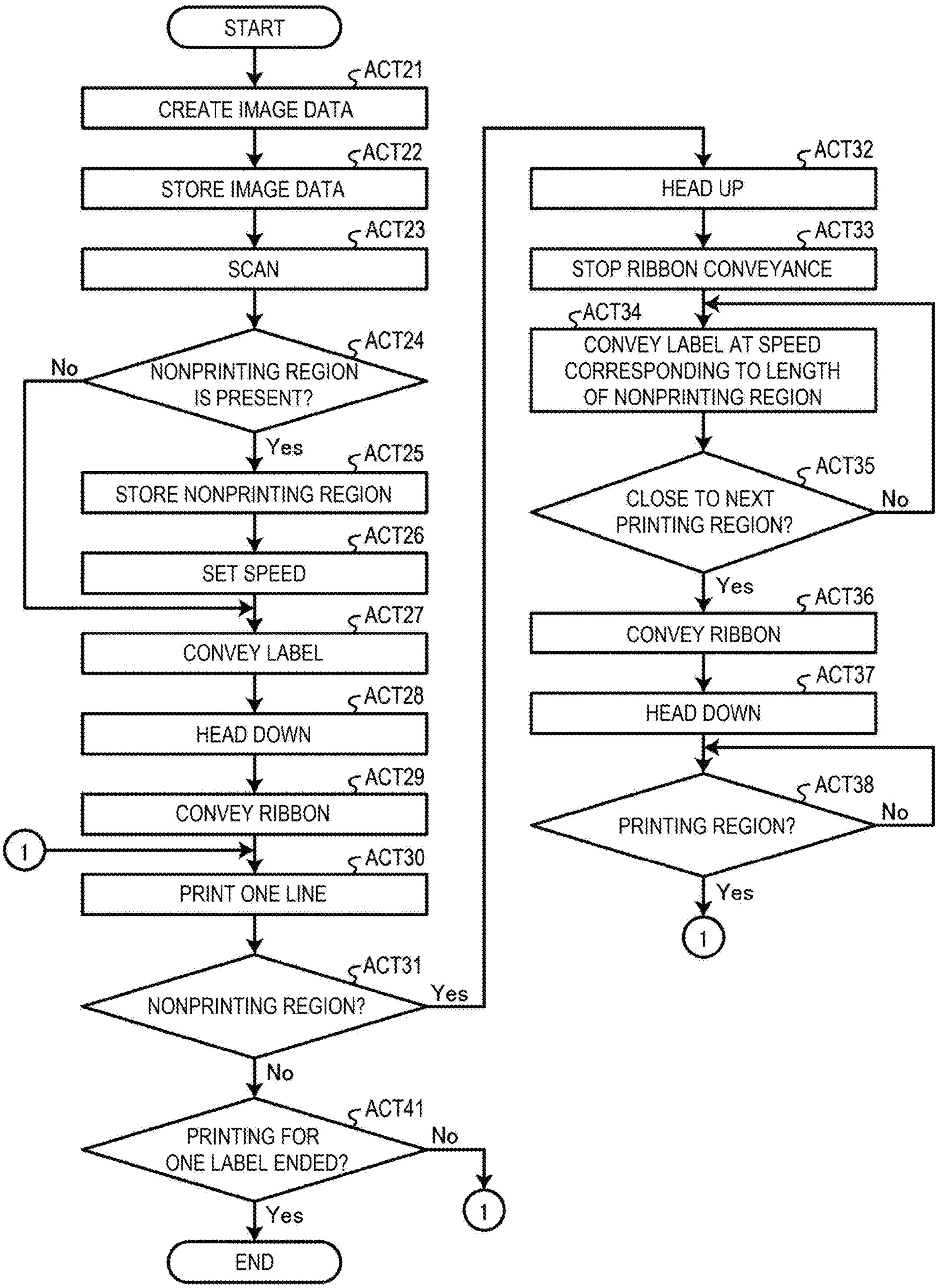
FIG. 11 is a flowchart of control processing relating to printing of a printer.
Figure 12:
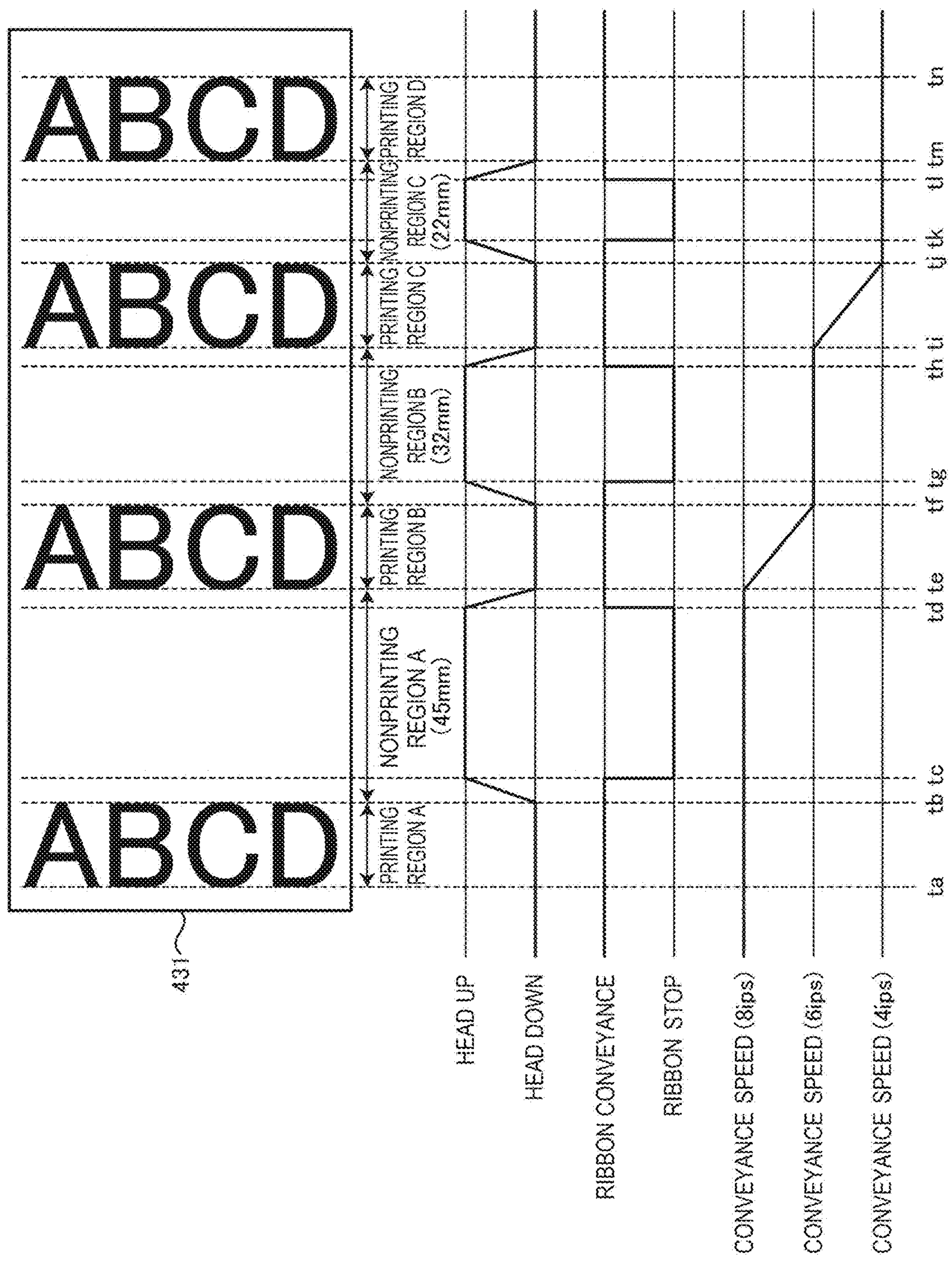
FIG. 12 is a timing chart illustrating an example of ink ribbon control and label conveyance control in printing regions and nonprinting regions.

The processing of the printer 1 for printing on the label L according to the printing data received from an external information processing device such as a PC is now explained. FIG. 11 is a flowchart of control processing relating to printing by the printer 1 when the mode 2 is stored in the set mode section 433 by the processing in ACT 13 or when the mode 2 is stored in the switching information section 434 by the processing in ACT 16. That is, the mode 2 is the currently set mode. FIG. 12 is a timing chart illustrating a sequence of operations for the units in a printing operation on the label L relating to the processing illustrated in FIG. 11.

As illustrated in FIG. 11, after receiving printing data from the external information processing device, the image data creating unit 405 creates image data in a bitmap format from the printing data (ACT 21). Then, the control unit 400 stores the created image data in the printing buffer 431 (ACT 22).

Subsequently, the scan unit 406 performs scan processing on the image data stored in the printing buffer 431 and determines whether each line is a printing region or blank region (ACT 23). Then, for the continuous blank regions (multiple blank lines in the printing sequence) as determined by the scan unit 406, the nonprinting region determining unit 403 refers to the information in the nonprinting region section 442 and determines whether these blank regions correspond to any of the nonprinting regions (ACT 24). If the blank regions correspond to one of the nonprinting regions (Yes in ACT 24), the control unit 400 stores information concerning the nonprinting regions in the nonprinting information section 432 (ACT 25). Then, the control unit 400 stores, in the nonprinting information section 432, length information relating to the nonprinting regions, conveying speed information of the label L, and coordinate information indicating the positions of each of the nonprinting regions (ACT 26). In the embodiment, as illustrated in FIGS. 7 and 8, for the nonprinting region A, the nonprinting region B, and the nonprinting region C in one label L, information concerning the length along the conveying direction of the label L is stored in the length information section 4322, conveying speed information for the label L is stored in the conveying speed section 4323, and coordinate information is stored in the coordinate information section 4324.

In FIG. 12, "head up" indicates that the printing head 32 is moving to the retracting position and "head down" indicates that the printing head 32 is moving to the printing position. "Ribbon conveyance" indicates that the ink ribbon 23 is conveyed and "ribbon stop" indicates that the conveyance of the ink ribbon 23 is stopped. "Conveying speed (8 ips)" indicates that the label L is conveyed at a rate of 8 ips, "conveying speed (6 ips)" indicates that the label L is conveyed at a rate of 6 ips, and "conveying speed (4 ips)" indicates that the label L is conveyed at a rate of 4 ips. Symbols/labels ta, tb, tc, td, te, tf, tg, th, ti, tj, tk, tl, tm, and tn refer to coordinates indicating distances in the arrow Y direction from a reference position (for example, the coordinate ta) in the printing buffer 431.

Subsequently, the control unit 400 starts conveyance of the label L (ACT 27). The moving unit 401 moves (heads down) the printing head 32 to the printing position (ACT 28). The control unit 400 rotates the ribbon winding shaft 22 to convey the ink ribbon 23 (ACT 29). Subsequently, the control unit 400 performs printing for one line in the arrow X direction located in the coordinate ta (ACT 30). The printing in ACT 30 includes printing including printing data in one line and printing not including printing data in one line (printing of a space for one line). Subsequently, the control unit 400 determines, based on the coordinate information stored in the nonprinting information section 432 (specifically, the coordinate information section 4324), whether the next line and subsequent consecutive lines are a nonprinting region (a blank region having a predetermined length or more) (ACT 31). If the next line and its subsequent lines are not a nonprinting region (No in ACT 31), the control unit 400 determines whether printing for one label L has ended (that is, the printing reached the coordinate tn) (ACT 41). If the printing for one label L did not end (No in ACT 41), the control unit 400 returns to ACT 30 and performs printing for the next line of the lines determines as No in ACT 31 (ACT 30).

If the processing in ACT 30 to No in ACT 41 is repeated (that is, the printing of the printing region A is performed) and the printing reaches the coordinate tb, the control unit 400 determines, based on the coordinate information stored in the coordinate information section 4324, that the next line to the coordinate the are a nonprinting region (Yes in ACT 31). At this point in time, with information stored in the nonprinting information section 432, the control unit 400 recognizes that 45 mm from the point covers the nonprinting region A. For that reason, the moving unit 401 moves (heads up) the printing head 32 to the retracting position. Since the head-up of the printing head 32 takes a little time and the label L is still conveyed during this process, the label L is conveyed from the coordinate tb to the coordinate tc while the printing head 32 heads up. The ink ribbon conveying unit 402 stops the conveyance of the ink ribbon 23. In FIG. 12, the conveyance of the ink ribbon 23 is stopped at the position of the coordinate tc. However, the conveyance of the ink ribbon 23 may be stopped at any timing between the coordinate tb and the coordinate tc.

Between the coordinate tb and the coordinate te, the first medium conveying unit 404 conveys the label L at the conveying speed stored in association with the nonprinting region A in the nonprinting information section 432 (ACT 34). In an example illustrated in FIG. 7, since the conveying speed of 8 ips is stored in association with the nonprinting region A, the first medium conveying unit 404 conveys the label L at the conveying speed of 8 ips between the coordinate tb and the coordinate the (ACT 34). In this way, the control unit 400 performs the ribbon save in the nonprinting region A.

The control unit 400 determines whether the printing reached the coordinate td, which is close to the next printing region (the printing region B) (ACT 35). Since a little time is required for head-down of the printing head 32 and the restarting of the conveyance of the ink ribbon 23, the ink ribbon conveying unit 402 starts conveyance of the ink ribbon 23 in the position of the coordinate td (ACT 36) and the moving unit 401 starts the head-down in the position of the coordinate td (ACT 37). However, the start of the conveyance of the ink ribbon 23 in ACT 36 may be performed at any timing between the coordinate td and the coordinate te. The control unit 400 determines whether the printing has reached the next printing region (which is a start position of the printing region B and is the coordinate the) (ACT 38). The control unit 400 stays on standby until the printing reaches the next printing position (conveys the label L at the conveying speed set in ACT 34) (No in ACT 38). When the next printing position is reached (the coordinate the is reached) (Yes in ACT 38), the control unit 400 returns to ACT 30, repeatedly executes ACT 30 to No in ACT 41 and performs printing of the printing region B.

While printing the printing region B, the control unit 400 performs processing for gradually reducing the conveying speed of the label L from 8 ips to 6 ips. The processing is for conveying the label L at 6 ips in the nonprinting region B based on the conveying speed (6 ips) corresponding to the nonprinting region B stored in the nonprinting information section 432. In FIG. 12, the conveying speed of the label L is gradually reduced to 6 ips from the coordinate the to the coordinate tf. However, the label L may be conveyed at 8 ips from the coordinate the to a halfway part of the printing region B and the conveying speed of the label L may be reduced to 6 ips from the halfway part to the coordinate tf. When the conveying speed of the label L is being gradually reduced, printing concentration of the label L may be kept constant using a known method of gradually reducing an applied voltage to the heat generating elements at the same time or gradually increasing an interval of applying a voltage.

When the printing reaches the coordinate tf, the control unit 400 performs head-up processing for the printing head 32 from the coordinate tf to the coordinate tg in ACT 32, performs conveyance stop processing for the ink ribbon 23 in the coordinate tg in ACT 33, and refers to the coordinate information section 4324 and performs conveyance processing for the label L at 6 ips between the coordinate tf and the coordinate ti in ACT 34. In this way, the control unit 400 performs the ribbon save in the nonprinting region B. When the printing reaches the position of the coordinate th, the control unit 400 starts conveyance of the ink ribbon 23 in ACT 36, performs the head-down processing for the printing head 32 in ACT 37, and performs printing of the printing region C.

Then, while printing the printing region C, the control unit 400 performs processing for gradually reducing the conveying speed of the label L from 6 ips to 4 ips (region from the coordinate ti to the coordinate tj).

When the printing has reached the coordinate tj, the control unit 400 performs head-up processing for the printing head 32 from the coordinate tj to the coordinate tk in ACT 32, performs conveyance stop processing for the ink ribbon 23 in the coordinate tk in ACT 33, and performs conveyance processing for the label L at 4 ips between the coordinate tj and the coordinate tm in ACT 34. In this way, the control unit 400 performs the ribbon save for the nonprinting region C. When the printing reaches the position of the coordinate tl, the control unit 400 starts conveyance of the ink ribbon 23 in ACT 36, performs head-down processing for the printing head 32 in ACT 37, and performs printing of the printing region D.

When the conveyance of the label L and the printing processing in the printing regions A to D and the conveyance of the label L in the nonprinting regions A to C end as explained above, the printing reaches the coordinate tn. In this case, since it is determined Yes in ACT 41, the printing processing for one label L ends.

If there is no nonprinting region (that is, all the blank regions are smaller than 20 mm) in ACT 24 (No in ACT 24), the control unit 400 performs the processing in ACT 27 and subsequent acts without performing the processing in ACT 25 and the processing in ACT 26. In this case, it is always determined No in ACT 31. That is, if all the blank regions are smaller than 20 mm, the control unit 400 does not perform ribbon save processing.

As explained above, if the mode 2 is stored in the set mode section 433 or the switching information section 434, the control unit 400 conveys the label L at the conveying speeds corresponding to the nonprinting regions stored in the nonprinting information section 432 and performs the ribbon save in the nonprinting regions. For that reason, it is possible to further save the amount of the ink ribbon 23 that is used.

Figure 13:
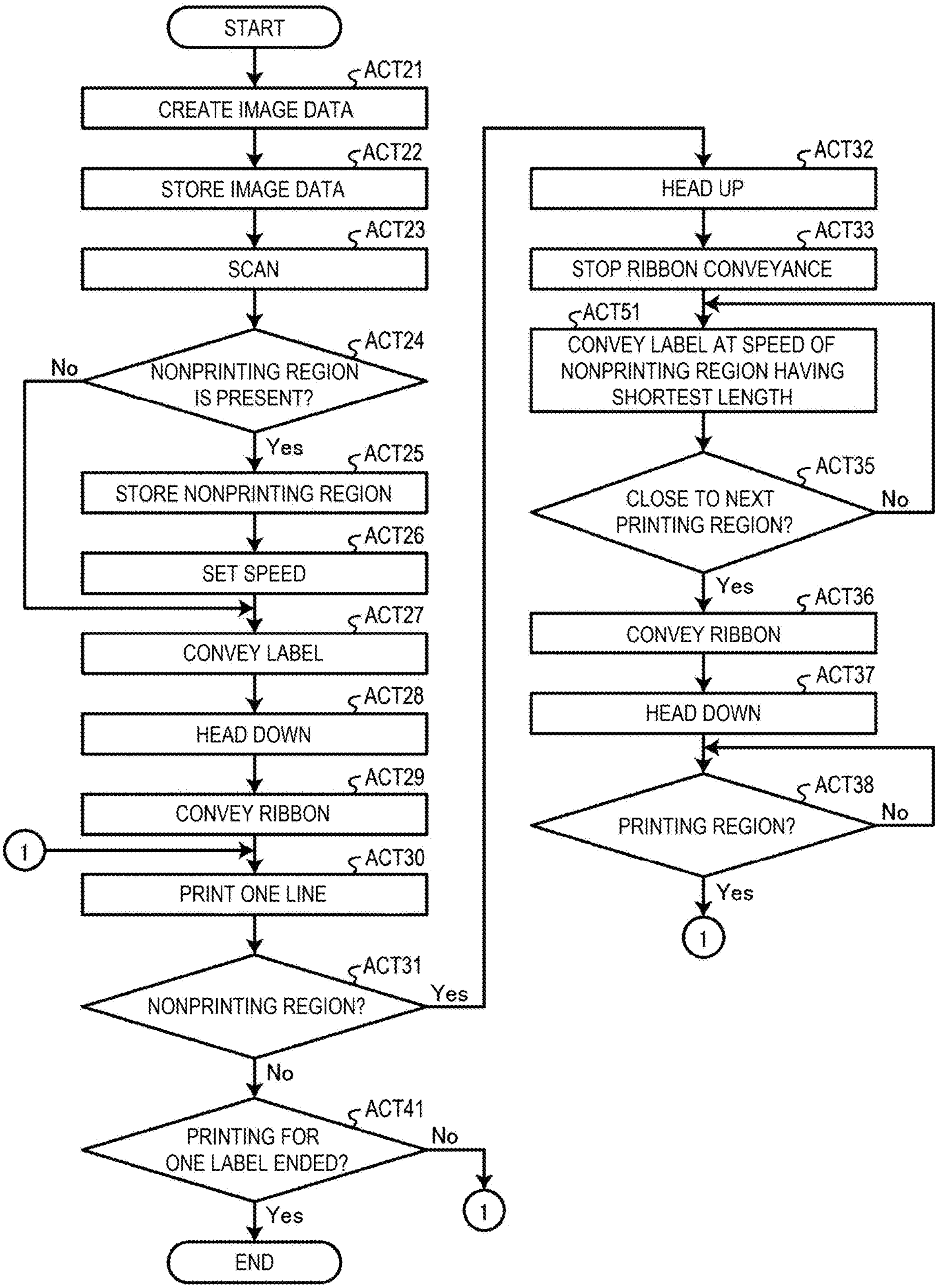
FIG. 13 is a flowchart of other control processing relating to printing of a printer.
Figure 14:
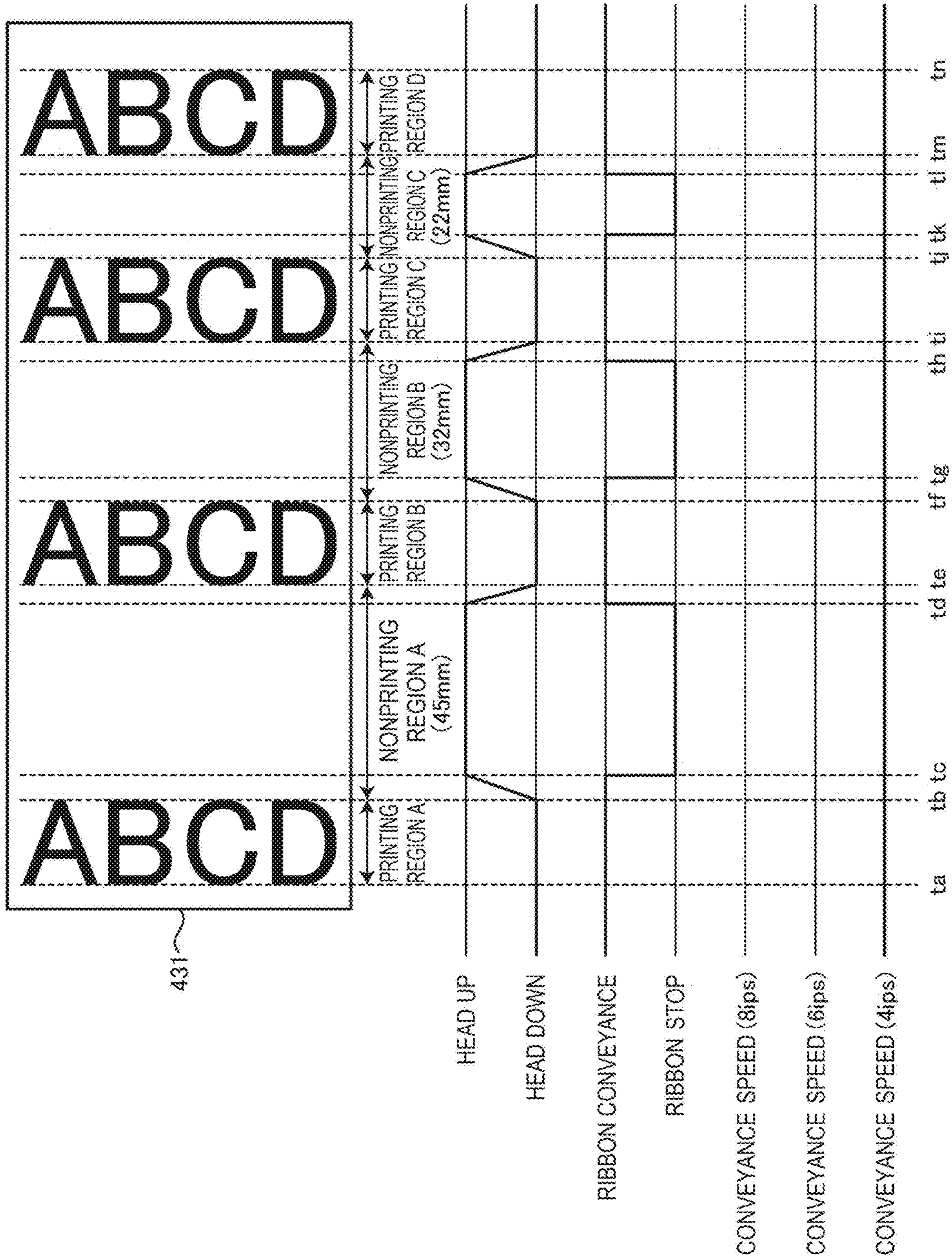
FIG. 14 is a timing chart illustrating another example of ink ribbon control and label conveyance control in printing regions and nonprinting regions.

FIG. 13 is a flowchart of control processing relating to printing of the printer 1 in the case in which the mode 3 is stored in the set mode section 433 by the processing in ACT 13 or the case in which the mode 3 is stored in the switching information section 434 by the processing in ACT 16. FIG. 14 is a timing chart illustrating a sequence of operations of the units in a process of performing a printing operation on the label L relating to the processing illustrated in FIG. 13. In the following explanation relating to the processing illustrated in FIG. 13 and relating to FIG. 14, the same aspects and the same processing as those illustrated in FIGS. 11 and 12 are denoted by the same reference symbols and the explanation of these aspects and the processing may be omitted or simplified.

In the example illustrated in FIG. 11, in the processing in ACT 34, the first medium conveying unit 404 refers to the nonprinting information section 432 created in the processing in ACT 25, conveys the label L in the nonprinting region A at 8 ips, conveys the label L in the nonprinting region B at 6 ips, and conveys the label L in the nonprinting region C at 4 ips.

In FIG. 13 (for the mode 3), in the processing in ACT 51, the second medium conveying unit 407 refers to the nonprinting information section 432 created in the processing in ACT 25 and conveys the label L in the nonprinting region A, the nonprinting region B, and the nonprinting region C at 4 ips. That is, in the nonprinting information section 432 illustrated in FIG. 7, 8 ips is stored in association with the nonprinting region A, 6 ips is stored in association with the nonprinting region B, and 4 ips is stored in association with the nonprinting region C. However, the second medium conveying unit 407 conveys the label L in the nonprinting region A, the nonprinting region B, and the nonprinting region C using the conveying speed (that is, 4 ips) stored in association with the nonprinting region having the shortest length (that is, the nonprinting region C) from among all the nonprinting regions A, B, and C of the label L (ACT 51). In the nonprinting region A, the nonprinting region B, and the nonprinting region C, the moving unit 401 heads up the printing head 32 and the ink ribbon conveying unit 402 stops the conveyance of the ink ribbon 23. In this way, the second medium conveying unit 407 performs the ribbon save operation in the nonprinting region A, the nonprinting region B, and the nonprinting region C.

In FIG. 14, the second medium conveying unit 407 conveys the label L at the conveying speed of 4 ips in a region between the coordinate tb and the coordinate the (that is, the nonprinting region A), conveys the label L at the conveying speed of 4 ips in a region between the coordinate tf and the coordinate ti (that is, the nonprinting region B), and conveys the label L at the conveying speed of 4 ips in a region between the coordinate tj and the coordinate tm (that is, the nonprinting region C). In FIG. 14, the second medium conveying unit 407 also conveys the label L at 4 ips in the printing region A, the printing region B, the printing region C, and the printing region D. However, in other examples, the conveying speed of the label L in each of the printing region A, the printing region B, and the printing region C, and the printing region D may be set according to the respective lengths of the printing regions.

As explained above, if the mode 3 is stored in the set mode section 433 or the switching information section 434 (that is, the mode 3 is set), the label L is conveyed in all of the nonprinting regions at the conveying speed corresponding to the shortest one of the nonprinting regions stored in the nonprinting information section 432 and the ribbon save operation is performed for all of the nonprinting regions. For that reason, it is possible to further save the ink ribbon 23.

Figure 15:
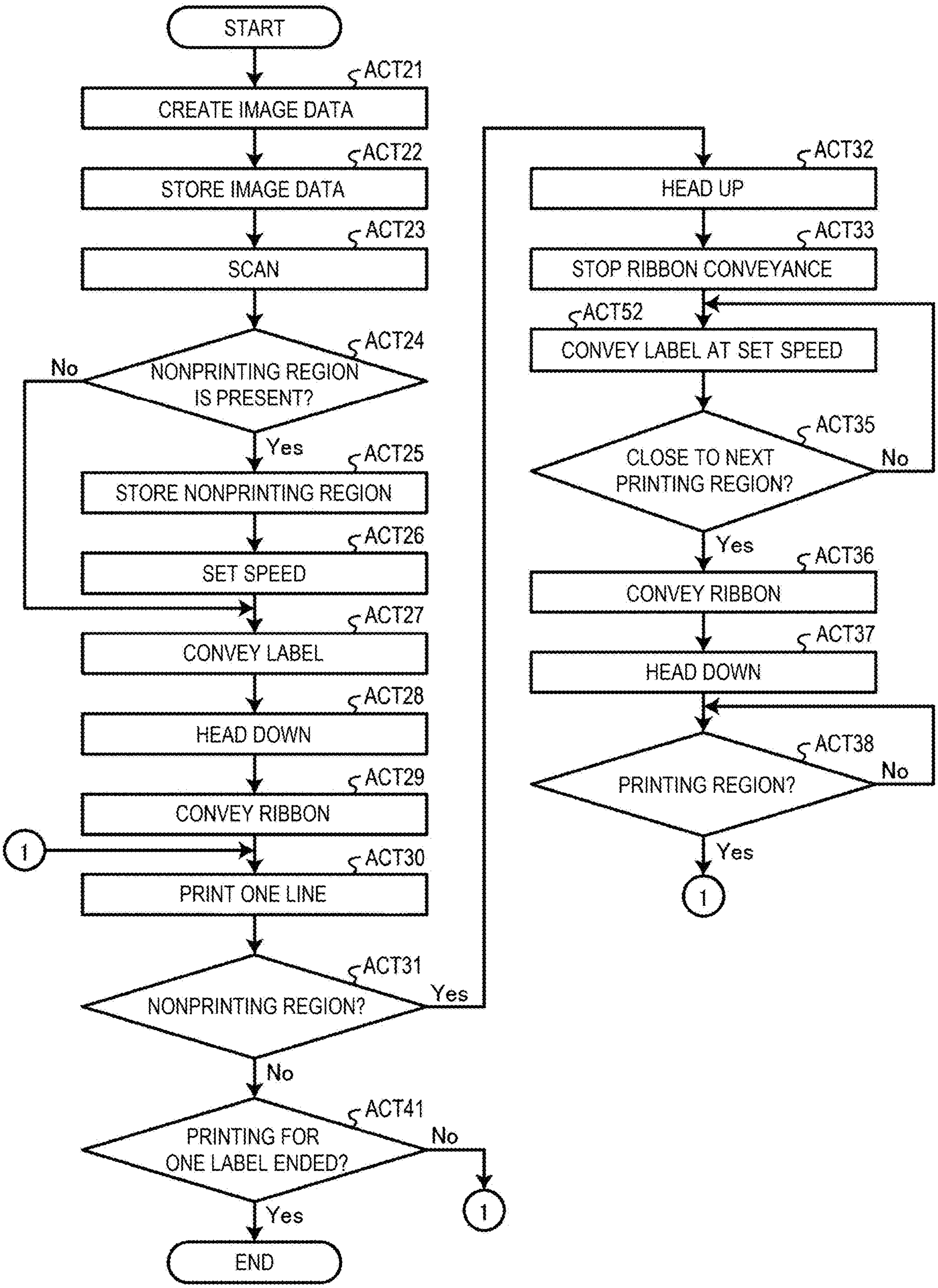
FIG. 15 is a flowchart of still another control processing relating to printing of a printer.
Figure 16:
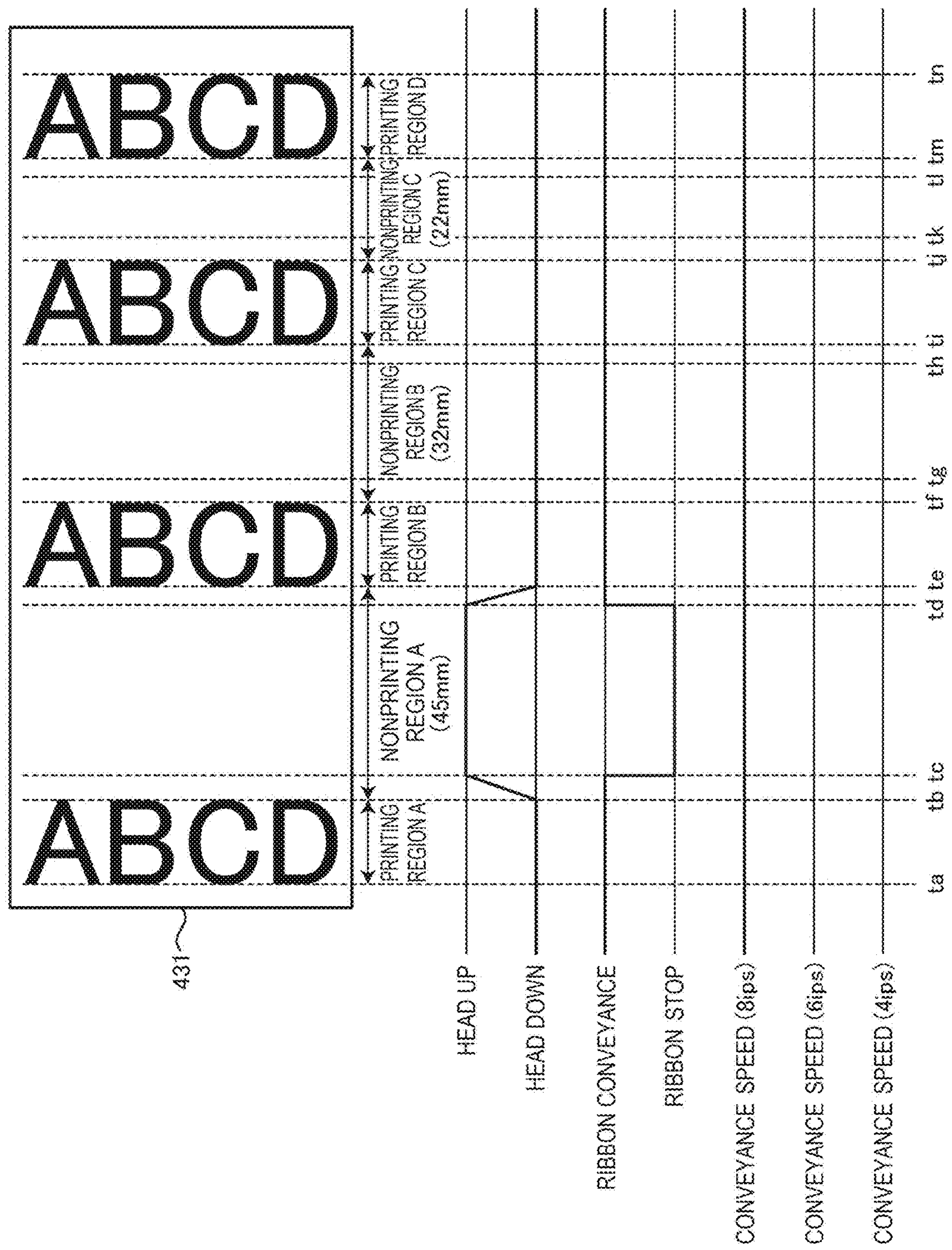
FIG. 16 is a timing chart illustrating still another example of ink ribbon control and label conveyance control in printing regions and nonprinting regions.

FIG. 15 is a flowchart of control processing relating to printing of the printer 1 in the case in which the mode 1 is stored in the set mode section 433 by the processing in ACT 13 or in the case in which the mode 1 is stored in the switching information section 434 by the processing in ACT 16. FIG. 16 is a timing chart illustrating, in time series, operations of the units in a process of performing, based on the image data stored in the printing buffer 431, a printing operation on the label L relating to the processing illustrated in FIG. 15. In the following explanation relating to FIGS. 15 and 16, the same components and the same processing as those illustrated in FIGS. 11 and 12 and FIGS. 13 and 14 are denoted by the same reference numerals and signs and explanation of the components and the processing is omitted or simplified.

In FIG. 15 (the mode 1), in processing in ACT 52, the control unit 400 conveys the label L at conveying speed set in the set speed section 444 in advance. The control unit 400 refers to the nonprinting information section 432 and performs the ribbon save for a nonprinting region where the ribbon save can be performed if the label L is conveyed at the conveying speed. For example, the conveying speed "8 ips" of the label L is set in the set speed section 444. The control unit 400 conveys the label L at 8 ips in the nonprinting region A, the nonprinting region B, and the nonprinting region C. Then, the control unit 400 refers to the nonprinting information section 432 and determines that the ribbon save is possible for the nonprinting region A because conveying speed corresponding to the nonprinting region A is 8 ips, heads up the printing head 32, and stops the conveyance of the ink ribbon 23. For the nonprinting region B and the nonprinting region C, since 6 ips and 4 ips (both of which are conveying speeds lower than 8 ips) are stored in the nonprinting information section 432, the control unit 400 does not head up the printing head 32 and does not stop the conveyance of the ink ribbon 23 for the nonprinting region B and the nonprinting region C. That is, the control unit 400 does not perform the ribbon save in the nonprinting region B and the nonprinting region C.

In FIG. 16, for the nonprinting region A, the control unit 400 heads up the printing head 32 between the coordinate tb and the coordinate the and stops the conveyance of the ink ribbon 23 between the coordinate tc and the coordinate td to perform the ribbon save. However, for the nonprinting region B, the control unit 400 does not head up the printing head 32 between the coordinate tf and the coordinate ti and does not stop the convenance of the ink ribbon 23 between the coordinate tg and the coordinate th. Similarly, for the nonprinting region C, the control unit 400 does not head up the printing head 32 between the coordinate tj and the coordinate tm and does not stop the conveyance of the ink ribbon 23 between the coordinate tk and the coordinate tl.

As explained above, the printer 1 includes a printing head 32 that performs printing on the conveyed label L, a moving unit 401 that moves the printing head 32 between the printing position and the retracting position, an ink ribbon conveying unit 402 that conveys the ink ribbon 23 for transferring ink to the label L and stops the conveyance, a nonprinting region section 442 that stores the conveying speeds of the label for nonprinting regions having different lengths for enabling ribbon save operations of the ink ribbon 23 for the different label L conveying speeds, a nonprinting region determining unit 403 that determines, based on printing data to be printed on the label L, whether one or a plurality blank regions correspond to any of the nonprinting regions stored in the nonprinting region section 442, and a first medium conveying unit 404 that performs the ribbon save operation when a blank region matches the parameters for of one of the stored nonprinting regions.

With the printer 1 explained above, the label L is conveyed in a nonprinting region at a conveying speed corresponding to the particular nonprinting region and the ribbon save operation is performed accordingly. For that reason, it is possible to further save the ink ribbon 23.

The printer 1 includes a printing head 32, a moving unit 401 that moves the printing head 32 between a printing position and a retracting position, an ink ribbon conveying unit 402 that conveys the ink ribbon 23, a nonprinting region section 442 that stores conveying speeds for the label L in association with different nonprinting region lengths for the ribbon save operation, a nonprinting region determining unit 403 that determines, based on printing data, whether one or more blank regions on the label L correspond to any of the stored nonprinting regions parameters in the nonprinting region section 442, and a second medium conveying unit 407 that, if it is determined that all the blank regions of a label L correspond to stored nonprinting regions parameters, the ribbon save operation is performed for all the blank regions at the label L conveying speed corresponding to the store nonprinting region parameters of the shortest length.

With the printer 1 explained above, the label L can be conveyed in all the nonprinting regions at a conveying speed corresponding to the shortest nonprinting region parameter and the ribbon save operation is performed for each accordingly. For that reason, it is possible to further save the amount of the ink ribbon 23 used.

The printer 1 includes printing head 32 that performs printing on the conveyed label L, moving unit 401 that moves the printing head 32 between the printing position and the retracting position, ink ribbon conveying unit 402 that conveys the ink ribbon 23 and stops the conveyance, nonprinting region section 442 that stores a plurality of conveying speeds of the label L in association with non-printing region lengths for enabling ribbon save for each of the label L conveying speeds, nonprinting region determining unit 403 that determines from the printing data whether one or more blank regions on the label L to be printed correspond to any of the nonprinting regions stored in the nonprinting region section 442, first medium conveying unit 404 that performs the ribbon save operation while the label L is conveyed at the conveying speed corresponding to the particular nonprinting region, second medium conveying unit 407 that performs the ribbon save operation conveying the label L is conveyed at the conveying speed corresponding to the nonprinting region having the shortest length among a plurality of blank region corresponds to nonprinting regions for all the nonprinting regions, and selecting unit 408 that selectively executes either of the first medium conveying unit 404 and the second medium conveying unit 407.

With the printer 1 explained above, the label L is conveyed by the selected one of the first medium conveying unit 404 or the second medium conveying unit 407 and the ribbon save is performed accordingly. For that reason, it is possible to further save the amount of the ink ribbon 23 used.

A particular example embodiment is explained above. However, this embodiment is not intended to limit the scope of the disclosure. The embodiments can be implemented in other various forms. Various omissions, substitutions, and changes can be made without departing from the gist of the invention. The embodiments and modifications thereof are included in the scope and the gist of the present disclosure.

For example, in an embodiment, the set speed section 444 is included in the memory unit 44. However, set speed section 444 is not necessarily an essential in all embodiments.

In an embodiment, the nonprinting region determining unit 403 scans the image data stored in the printing buffer 431 and determines whether a blank region corresponds to any nonprinting region. However, the nonprinting region determining unit 403 may instead determine based on, for example, information concerning nonprinting regions included in the printing data received from an information processing device, whether a blank region corresponds to any nonprinting region. In this case, a component that scans the image data stored in the printing buffer 431 may be unnecessary.

In an embodiment, the processing illustrated in FIG. 11 of the control unit 400 is for when the mode 2 is stored in the set mode section 433 or the switching information section 434, the processing illustrated in FIG. 13 of the control unit 400 is for when the mode 3 is stored in the set mode section 433 or the switching information section 434, and the processing illustrated in FIG. 15 of the control unit 400 is for when the mode 1 is stored in the set mode section 433 or the switching information section 434. However, the printer 1 in some examples may be only a device that can perform processing relating to the mode 2, a device that can perform processing relating to the mode 3, or a device that can switch and perform the processing relating to the mode 2 and the processing relating to the mode 3. The processing relating to the mode 1 is not necessarily essential for all embodiments.

In an embodiment, a blank region equal to or larger than 20 mm is set as the nonprinting region. However, this value may be determined as appropriate according to the performance and the like of the printer 1.

In an embodiment, a label L is explained as an example of the medium to be printed. However, not only this, but the medium only has to be paper or the like permitting scanning bitmap data loaded in the printing buffer 431, recognizing a nonprinting region, and performing the ribbon save and performing printing in the nonprinting region and may be, for example, receipt paper. If the receipt paper is printed, the printer 1 can be referred to as a receipt printer.

Programs to be executed in the printer 1 in an embodiment and the modifications thereto may be provided by being recorded in a non-transitory, computer-readable recording medium such as a CD-ROM, a flexible disk (FD), a CD-R, or a DVD (Digital Versatile Disk) as a file of an installable format or an executable format.

The programs to be executed in the printer 1 in an embodiment and modifications thereto may be configured to be stored on a computer connected to a network such as the Internet and provided by being downloaded through the network. The programs to be executed in the printer 1 and the modifications may be configured to be provided or distributed through the network such as the Internet.

The programs to be executed in the printer 1 in the embodiment and the modifications may be configured to be provided by being incorporated in a ROM or the like in advance.

While certain embodiments have been described, these embodiments have been presented by way of example only, and are not intended to limit the scope of the present disclosure. Indeed, the novel embodiments described herein may be embodied in a other variety of forms; furthermore, various omissions, substitutions and changes in the form of the embodiments described herein may be made without departing from the spirit of the inventions. These embodiments and modifications thereof are included in the scope and spirit of the present disclosure, and are included in the inventions described in the claims and the scope of equivalents thereof.

What is claimed is:

1. A printer, comprising:

a printing head configured to perform printing on a conveyed medium via an ink ribbon;

a moving unit configured to move the printing head between a printing position and a retracted position;

an ink ribbon conveying unit configured to convey the ink ribbon for printing on the conveyed medium by the printing head;

a storage unit configured to store nonprinting region dimensions in association with medium conveying speeds for ribbon save operations, the ribbon save operations including conveying the conveyed medium in a blank region at a particular medium conveying speed while stopping the conveyance of the ink ribbon;

a nonprinting region determining unit configured to determine from printing data of an image to be printed on the conveyed medium whether there are any blank regions in the image corresponding to any of the nonprinting region dimensions stored in the storage unit; and a first medium conveying unit configured to perform a ribbon save operation in any of the blank regions corresponding to the stored nonprinting region dimensions by conveying the conveyed medium at the particular medium conveying speed through the blank region while stopping the conveyance of the ink ribbon.

2. The printer according to claim 1, further comprising:

a second medium conveying unit configured to perform the ribbon save operation in all of the blank regions when each of the blank regions corresponds to at least one of the stored nonprinting region dimensions by conveying the conveyed medium at the medium conveying speed associated with the shortest one of the stored nonprinting region dimensions to which at least one of the blank regions corresponds.

3. The printer according to claim 2, further comprising:

a selecting unit configured to select between utilization of the first medium conveying unit or the second medium conveying unit.

4. The printer according to claim 3, wherein the printing data of the image to be printed is bitmap data.

5. The printer according to claim 1, wherein the printing data of the image to be printed is bitmap data.

6. The printer according to claim 1, wherein the ribbon save operations include moving the print head from the printing position to the retracted position.

7. The printer according to claim 6, wherein the conveyed medium comprises a label.

8. The printer according to claim 1, wherein the conveyed medium comprises a label.

9. A printer, comprising:

a printing head configured to perform printing on a conveyed medium via an ink ribbon;

a moving unit configured to move the printing head between a printing position and a retracted position;

an ink ribbon conveying unit configured to convey the ink ribbon for printing on the conveyed medium by the printing head;

a storage unit configured to store nonprinting region dimensions in association with medium conveying speeds for ribbon save operations, the ribbon save operations including conveying the conveyed medium in a blank region at a particular medium conveying speed while stopping the conveyance of the ink ribbon;

a nonprinting region determining unit configured to determine from printing data of an image to be printed on the conveyed medium whether there are any blank regions in the image corresponding to any of the nonprinting region dimensions stored in the storage unit; and a second medium conveying unit configured to perform a ribbon save operation in all of the blank regions when each of the blank regions corresponds to at least one of the stored nonprinting region dimensions by conveying the conveyed medium at the medium conveying speed associated with the shortest one of the stored nonprinting region dimensions to which at least one of the blank regions corresponds.

10. The printer according to claim 9, wherein the ribbon save operations include moving the print head from the printing position to the retracted position.

11. The printer according to claim 10, further comprising:

a first medium conveying unit configured to perform the ribbon save operation in any of the blank regions corresponding to the stored nonprinting region dimensions by conveying the conveyed medium at the particular medium conveying speed through the blank region while stopping the conveyance of the ink ribbon.

12. The printer according to claim 11, further comprising:

a selecting unit configured to select between utilization of the first medium conveying unit or the second medium conveying unit.

13. The printer according to claim 12, wherein the printing data of the image to be printed is bitmap data.

14. The printer according to claim 9, wherein the printing data of the image to be printed is bitmap data.

15. The printer according to claim 9, wherein the conveyed medium comprises a label.

16. A printer, comprising:

a thermal printing head configured to perform printing on a label medium via an ink ribbon;

a moving unit configured to move the thermal printing head between a printing position and a retracted position;

an ink ribbon conveying unit configured to convey the ink ribbon for printing on the label medium by the thermal printing head;

a storage unit storing nonprinting region dimensions in association with label conveying speeds for ribbon save operations, the ribbon save operations including conveying the label medium in a blank region at a particular label conveying speed while stopping the conveyance of the ink ribbon;

a nonprinting region determining unit configured to determine from printing data of an image to be printed on the label medium whether there are any blank regions in the image corresponding to any of the nonprinting region dimensions stored in the storage unit;

a first medium conveying unit configured to perform a ribbon save operation in any of the blank regions corresponding to the stored nonprinting region dimensions by conveying the label medium at the particular label conveying speed through the blank region while stopping the conveyance of the ink ribbon;

a second medium conveying unit configured to perform the ribbon save operation in all of the blank regions when each of the blank regions corresponds to at least one of the stored nonprinting region dimensions by conveying the label medium at the label conveying speed associated with the shortest one of the stored nonprinting region dimensions to which at least one of the blank regions corresponds; and a selecting unit configured to select between utilization of the first medium conveying unit or the second medium conveying unit.

17. The printer according to claim 16, further comprising:

an image data creating unit configured to create image data that the thermal printing head prints on the label medium from printing data; and a scan unit configured to perform a scan on the created image data for determining line-by-line whether each line in the created image data is a blank line.

18. The printer according to claim 17, wherein the created image data is bitmap data.

19. The printer according to claim 17, wherein the ribbon save operations include moving the thermal print head from the printing position to the retracted position.

20. The printer according to claim 16, wherein the ribbon save operations include moving the thermal print head from the printing position to the retracted position.

* * * * *